INVENTORS
HERBERT GRIFFIN
ALBERT KINDELMANN
BY
Emery, Varney, Whittemore & Dix
ATTORNEYS March 5, 1940.   H. GRIFFIN ET AL   2,192,641
MOTION PICTURE APPARATUS
Filed Aug. 7, 1936   4 Sheets-Sheet 2
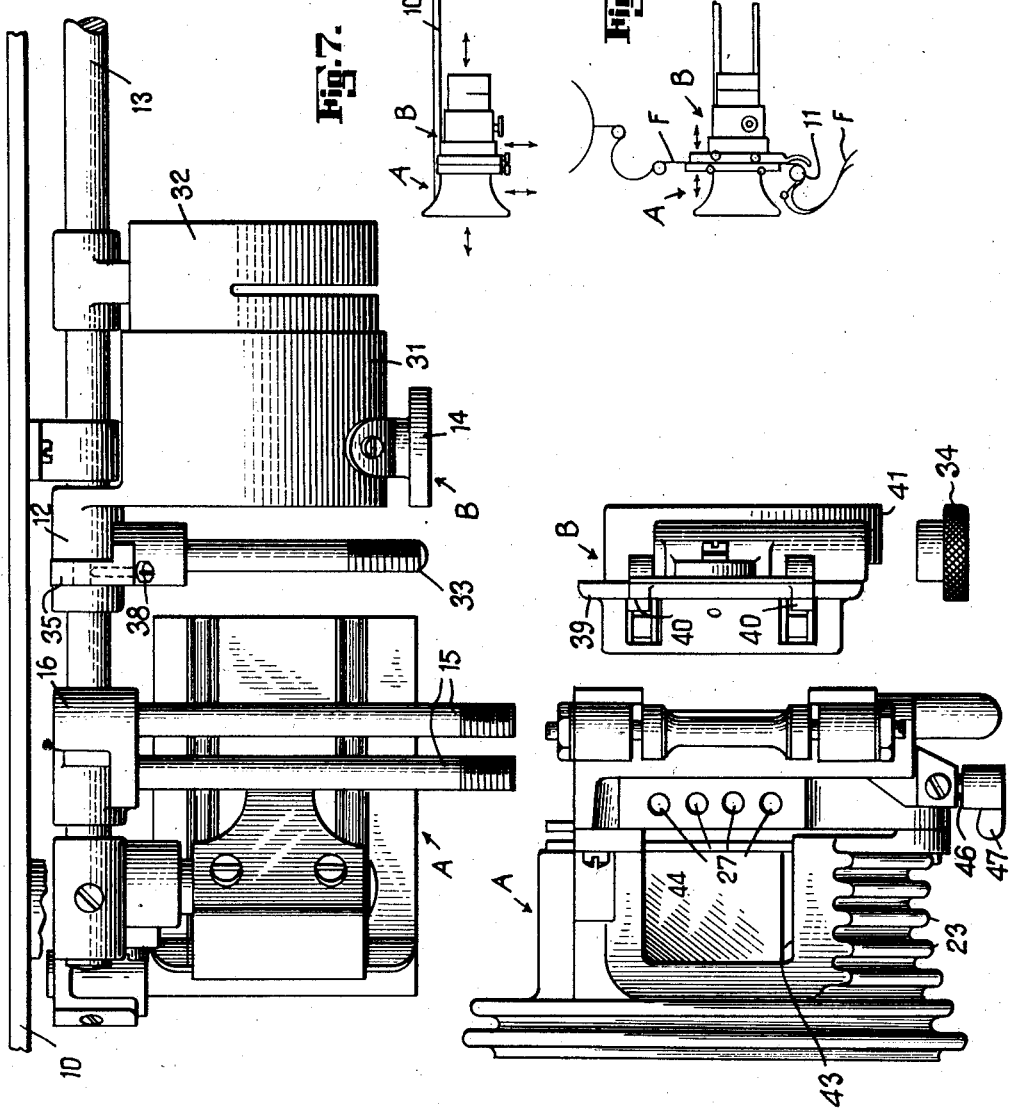
INVENTORS
HERBERT GRIFFIN
ALBERT KINDELMANN
BY
Emery, Varney, Whittemore + Dix
ATTORNEYS March 5, 1940.     H. GRIFFIN ET AL     2,192,641
MOTION PICTURE APPARATUS
Filed Aug. 7, 1936     4 Sheets-Sheet 3
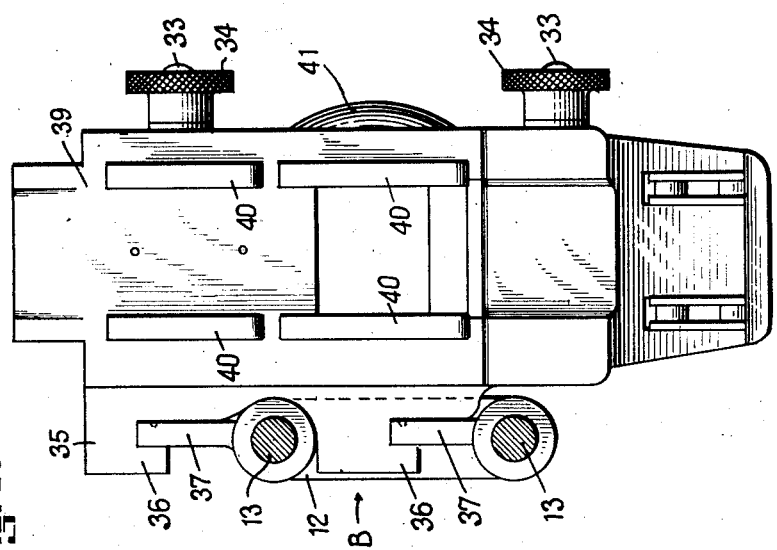
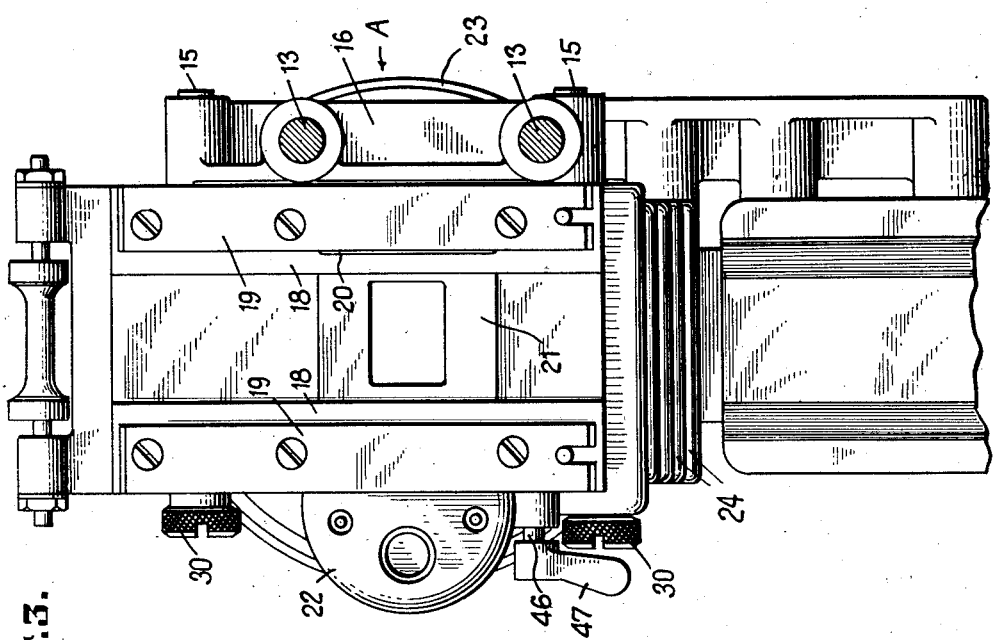
INVENTORS
HERBERT GRIFFIN
ALBERT KINDELMANN
BY
Emery, Varney, Whittemore & Dix
ATTORNEYS March 5, 1940.  H. GRIFFIN ET AL  2,192,641
MOTION PICTURE APPARATUS
Filed Aug. 7, 1936  4 Sheets-Sheet 4
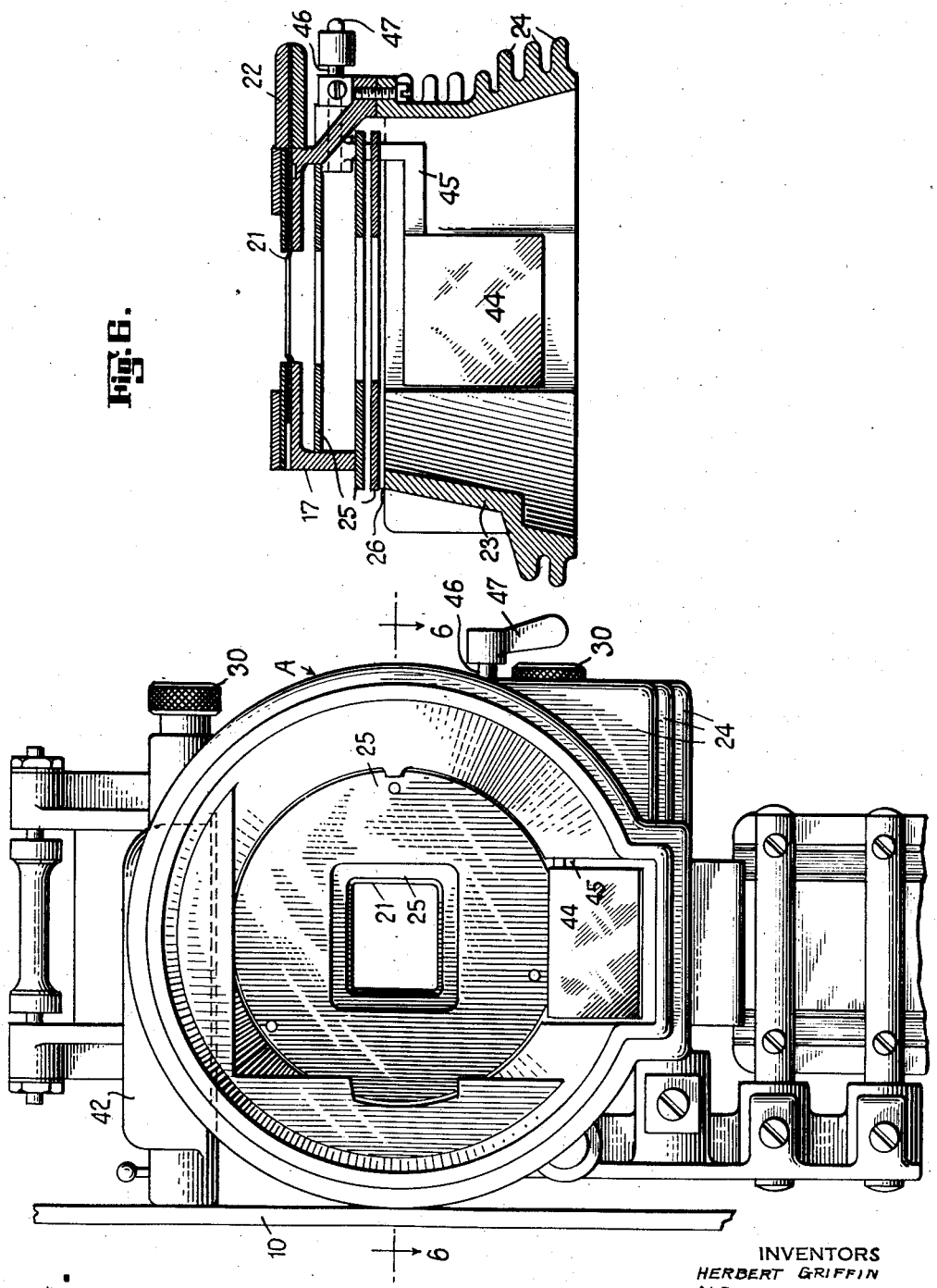

Patented Mar. 5, 1940

2,192,641

UNITED STATES PATENT OFFICE 2,192,641

MOTION PICTURE APPARATUS

Herbert Griffin, Jersey City, N. J., and Albert Kindelmann, Floral Park, N. Y., assignors to the International Projector Corporation, New York, N. Y., a corporation of Delaware Application August 7, 1936, Serial No. 94,722

5 Claims. (Cl. 88—17)

This invention relates to motion picture apparatus, and has for an object the provision of improvements in this art.

While in certain aspects at least, the present invention is applicable to cameras, it is principally intended for projection machines and especially for high-duty commercial projection machines.

Motion picture cameras and projection machines are provided with means or mechanism for guiding and supporting the film strip in and during its passage through a beam of light. This mechanism is often referred to comprehensively as "gate mechanism" or "gate." The mechanism comprises companion parts or elements, one for each side of the film strip, which usually are separable to provide access to the space between them for threading the film strip, for cleaning or for other purposes. One part or element may be fixed in position and one part may be movable. Very commonly the fixed part is referred to as the "trap" and the movable part is referred to restrictively as the "gate." The "trap" is also sometimes referred to as "trap assembly," and the "gate" as "gate assembly" as will be noted hereinafter.

There have been proposals in the prior art to make one of these parts or elements removable, as well as separable, the better to permit of cleaning or repair. However, so far as known, none of the proposed devices have been as simple, sturdy and convenient as is desirable if they are to come into general commercial use.

There has also been a need for simple and convenient means for illuminating the film when the normal source of light or projecting light is inoperative as during threading, and while some proposals have been made in this direction they have not been entirely satisfactory.

Moreover, there has been a need for means of a simple and efficient nature for dissipating heat from the projecting light or beam in the vicinity of the gate mechanism.

One feature of the invention is the provision of a simple, rugged, durable and efficient construction whereby a part or all of a film trap and gate assembly may be readily and easily displaced sufficiently from its normal position to permit repair or cleaning or to be removed entirely for replacement, adjustment, repair or cleaning.

Another feature is the provision of improved means for illuminating the film strip when the normal source of light is rendered inoperative for projection whereby the operator may see how to frame the film in the machine.

Another feature is the provision of improved light confining and heat dissipating apparatus.

Further objects, features and advantages of the invention will more clearly appear from the following specification when considered in connection with the accompanying drawings showing a preferred form of the invention.

In the drawings:

Fig. 2 is a top plan view of the same, showing certain parts removed from their normal positions;

Fig. 3 is a transverse view taken on the line 3—3 of Fig. 1, showing the film trap assembly in front elevation;

Fig. 4 is a transverse view taken on the line 4—4 of Fig. 1, showing the film gate assembly in rear elevation;

Fig. 5 is a left end elevation;

Fig. 6 is a horizontal section taken on the line 6—6 of Fig. 5; and

Figs. 7 and 8 are diagrammatic plan and elevation views respectively, illustrating the principles of the invention.

Figure 1:
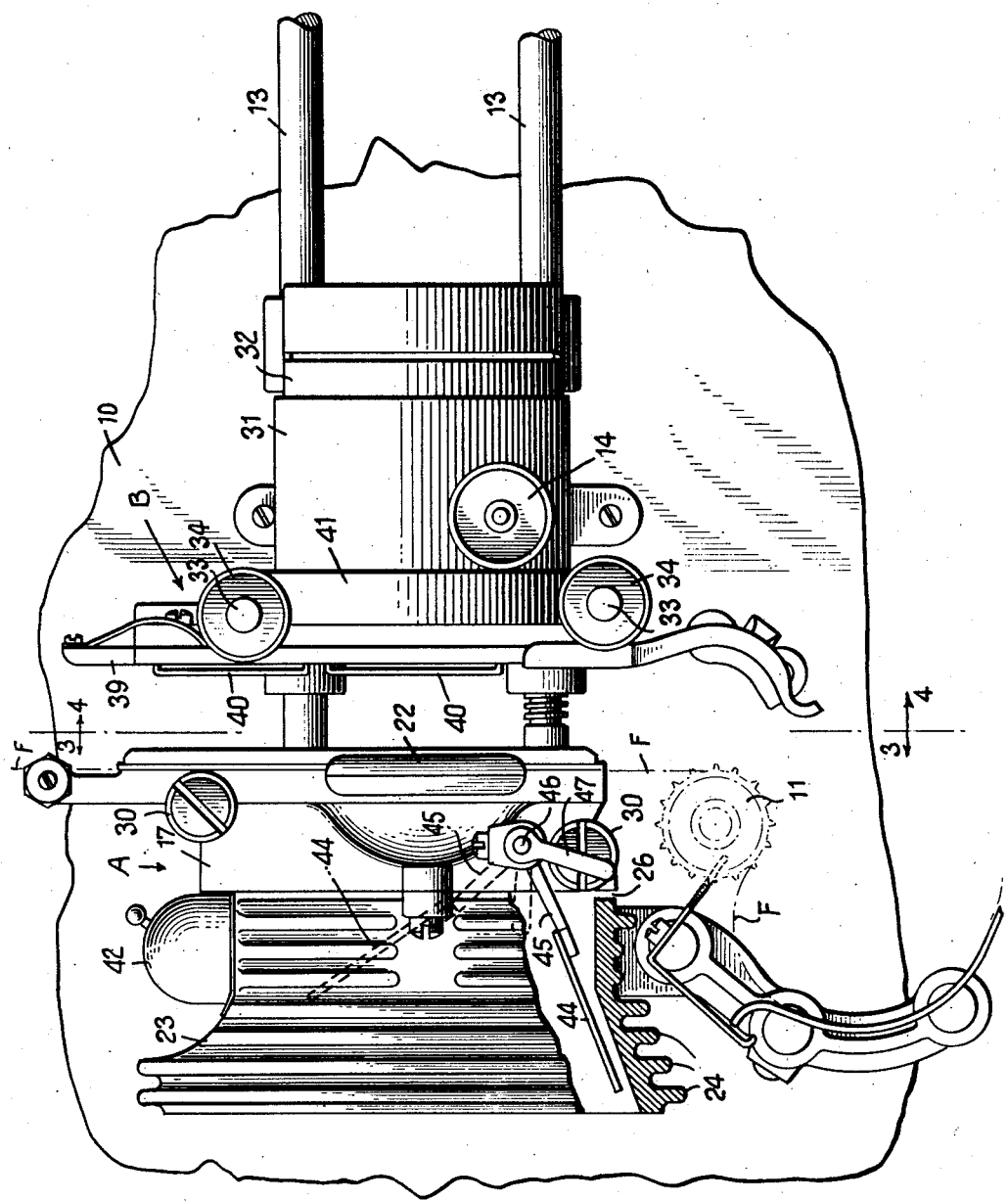
Fig. 1 is a side elevation, partly in section, of projecting apparatus embodying the invention, the film guiding mechanism being shown in separated position as for threading film therein or other purposes.

Referring to the drawings, the numeral 10 refers to a frame or support of the machine upon which the apparatus shown and described herein is mounted. A film strip F carried on the usual sprockets or drums and driven by any suitable mechanism, such for example, as the intermittent drive sprocket 11, passes between guiding or positioning means or elements which may be referred to generally as the film trap assembly A and the film gate assembly B.

These elements or assemblies may be mounted for movement relative to each other in a direction approximately normal to the face or plane of the film for confining it between them or for releasing it. The usual procedure is to separate the assemblies when a new strip of film is being threaded into the machine or when for any other purpose, such as for cleaning or repair, it is necessary or desirable to gain access to the space or parts adjacent the space between the assemblies.

In the present embodiment, except in the diagrammatic views 7 and 8, only one of the assemblies is shown to be mounted for separative movement, namely the gate assembly, but the arrangement may be otherwise if desired. As illustrated, the gate assembly B is provided at the rear with a slide member 12 formed with tubular openings adapted to move along guide rods 13 secured to the frame 10.

Any desired means may be provided for moving the assembly B and securing it in position. For example, one of the rods 13 may have a rack formed on a portion of its length to cooperate with a gear on a shaft operated by a knob 14, this traversing and locking mechanism being of a type disclosed in Patent No. 1,900,920 to Dina, granted March 14, 1933.

The assembly B is shown herein to be slidable in a straight line which is perpendicular or normal to the face or plane of the film but other types of separating movement may be provided, and in any case, since the initial movement of separation will be substantially normal to the plane of the film, this term will be considered as descriptive of all such movements, whether or not it would be accurately descriptive of all movements considered in their entirety.

The film trap assembly A, which is shown herein as secured against movement in a direction normal to the plane of the film strip, may be mounted in any suitable manner but preferably on lateral rods 15 secured to a casting 16 anchored to the rods 13 for a purpose which will be explained hereinafter.

The film trap assembly A includes a body member or casting 17 provided with an oversized aperture, runner plates 18, guide plates 19, and a side-bearing spring-pressed shoe 20. The casting may, as shown, be provided with a laterally opening guideway or slot for receiving a removable aperture plate 21. By this arrangement plates having different sizes of apertures may be introduced. The aperture plate is provided at its outer end with a finger grip member 22 by which it may be grasped for insertion or removal.

The film trap assembly may also include and have mounted with it a light tube or casting 23. This is a specific designation since the entire trap assembly may be said to constitute a light tube. In order to dissipate heat from the beam of light passing through the tube during projection the light tube 23 may be provided on its outer surface with fins or vanes 24.

Further to assist in dissipating heat there may be provided near the front end of the light tube and within the film trap casting a plurality of apertured plates 25 of a material which is a good conductor of heat, such as copper or brass. Moreover, a small space 26 may be left between the light tube 23 and the film trap casting 17 and apertures 27 may be formed in the top and bottom of the trap casting for providing air circulation through the assembly, especially near the heat radiating plates 25. Two of the plates 25 are disposed fairly close together approximately between the castings 17 and 23 and one of the plates 25 is spaced some distance from the other two, being located very near the aperture plate 21.

In order to provide access to the space or to the parts which lie adjacent to the space between the assemblies A and B, either one or both of them may be mounted in such fashion as to be readily removable from the machine. For convenience of illustration and description both assemblies are shown in the drawings as being removable. On account of the fact that certain parts interfit when the assemblies are brought together for securing the film strip it is arranged that the parts may be removed when the assemblies have been separated, as shown in Fig. 1. The parts are mounted for guided movement during removal in a plane parallel to the plane of the film strip, preferably in a straight line which is perpendicular to the edge of the film strip. With usual apparatus this would mean removal laterally in a horizontal line. This definition refers to the normal operating positions of parts, and while not necessarily strictly accurate when applied to all forms of mechanism when in the separated or film-releasing position, it will be used as if it were. In the particular mechanism illustrated herein where the parts separate along straight lines perpendicular to the plane of the film it is strictly accurate to say that the parts are removed in a plane parallel to the plane of the film. In the particular mechanism illustrated it is also true that the parts are removed in straight lines in a direction perpendicular to the edge of the film strip.

As best shown in Fig. 2, the film trap assembly A slides off the ends of the rods 15, the knurled thumb nuts 30 being removed to permit this.

As shown herein the film gate assembly B is also removable in addition to being movable for separation from the film trap assembly. The slidable casting 12 has already been described. It may have fixedly secured to it a light barrel 31 which telescopically engages a smaller light barrel 32 which is fixed in position on the rods 13. The barrel 32 connects with or forms a part of the lens barrel of the projection machine.

The gate assembly is mounted for sliding and guided movement on the lateral rods 33, knurled thumb nuts 34 being taken off when the assembly is to be removed. The rods 33 may be secured directly to the slide casting 12 or may, as shown, be secured to an intermediate supporting member or hanger 35 which is itself removably mounted on the slide casting. One convenient way of mounting the hanger is shown herein and comprises hooks 36 formed on the hanger which are adapted to engage upstanding bracket plates 37 formed on the slide casting 12. Set screws 38 may be employed for securing the hanger on the bracket plates.

The gate assembly includes an apertured gate plate 39 and a plurality of spring-pressed shoes 40 adapted to engage the surface of the film strip near its outer edges. A short barrel portion 41 is provided on the gate assembly and this in assembled position registers with the end of the barrel 31.

Means are provided for illuminating the film at the film aperture of the film trap assembly when the normal beam of light is rendered inoperative for projecting to enable the operator to see the film strip and register a picture frame with the aperture when threading the film. As shown herein, these means may comprise a shielded lamp 42 which is positioned above an opening 43 in the top of the light tube 23. This lamp when switched on throws a beam of light into the light tube. Since this beam is directed transversely of the light tube it is desirable to provide means for changing its direction into alignment with the axis of the tube so it will pass fairly through the film aperture and more clearly illuminate the film strip positioned thereat. Such means, however, should not obstruct the beam of light which is used during projection. The means herein shown for deflecting the film illuminating beam or framing light comprises a mirror 44, preferably of metal, which is mounted on an arm 45 fast on a shaft 46 which passes through the side of the film trap casting. The shaft 46 is provided with an arm or finger piece 47 on its outer end in a position convenient to the operator while threading the film.

The mirror may be raised to an upper position shown in dotted lines in Fig. 1 for reflecting the beam of light from the lamp 42 through an angle of approximately 90° to illuminate the film strip but normally lies in a lower position, as shown in full lines in Fig. 1, where it will not obstruct the projecting beam passing through the light tube. When raised, the finger piece 47 stands clear of the knurled thumb nut 30 which normally lies behind it, whereby access may be had to the nut for turning it on or off.

Figs. 7 and 8 illustrate in a diagrammatic manner the various movements provided for. The horizontal double arrows indicate that either the trap assembly A or the gate assembly B or both may be moved back and forth for separative movement for confining or releasing the film. The other figures of the drawings show only the gate assembly as movable for separation, and perhaps this will be the usual arrangement, but the trap assembly may be movably mounted if desired. The vertical double arrows in Figs. 7 and 8 indicate that either the trap assembly A or the gate assembly B may be removed and replaced or simply moved outward and back, depending on the length of the lateral supporting guides.

It is thus seen that the invention provides improved means for removably supporting the separable film guiding means; improved means for illuminating the film strip when the projecting light is cut off or obstructed; and improved means for dissipating heat from the beam of light. The manipulation of the apparatus, it is believed, will be obvious from the foregoing description without further amplification.

The improved mounting means for trap and gate assemblies hereby provided permit either or both to be separated from the other as well as to be moved out or removed laterally in a quick and simple manner and in these movements the assemblies are accurately guided so that there is no chance for parts to strike each other so as to be damaged or broken. Ready access to the parts and to the space between them and easy and rapid manipulation for cleaning, repair or replacement are thus provided.

The improved heat dissipating means insures that the film and related parts will be preserved from injury even when a high duty lamp or an arc is used as the source of the projection light.

The auxiliary film illuminating light and reflector provide a simple and easily manipulated arrangement for enabling the operator to thread and frame the film when the projecting light is not effective for illuminating the film. The operator by a mere movement of the thumb or finger of one hand, which at the same time is employed for placing the film in its guides and on the sprockets, may throw the light reflector up into proper operating position; and when he releases the operating finger piece therefor the reflector will fall by gravity to its lower or outer position where it will not obstruct the projecting light.

While the invention has been described in detail and with respect to a present preferred embodiment thereof, it is not to be limited to such form and details since many changes and modifications may be made without departing from the spirit and scope of the invention in its broadest aspects. Hence it is desired to cover any and all forms and modifications of the invention which come within the language or scope of any one or more of the appended claims.

We claim:

1. Motion picture apparatus comprising in combination, a support, a pair of elements mounted on said support and adapted to hold and guide a film strip through a beam of light, one of said elements being movable along the support toward and from the other in a direction generally normal to the plane of the film for confining or releasing it, and each of said elements being independently mounted on said support for sliding movement in a plane parallel to the plane of the film and along a line normal to the edge of the film.

2. Motion picture apparatus comprising in combination, a film trap assembly, a film gate assembly, one of said assemblies being mounted for separative movement from the other in a direction normal to the plane of the film strip for confining or releasing the film strip, and members independently supporting each of said assemblies for guided sliding movement for removal in a plane parallel to the plane of the film strip.

3. Motion picture apparatus comprising in combination, a support, two laterally extending sets of guides on said support, a film trap assembly slidably mounted on one of said sets of guides, a film gate assembly slidably mounted on the other set of guides, one of said assemblies being mounted on said support for separative movement from the other in a direction normal to the plane of the film strip, the sets of guides supporting each of said assemblies so that either of said assemblies may be independently removed from the support in a plane parallel to the plane of the film strip and along a line normal to the edge of the film strip.

4. Motion picture apparatus comprising in combination, a film trap assembly, a film gate assembly mounted for sliding movement from and toward the trap assembly in a direction normal to the surface of the film strip for confining or releasing the film strip, a hanger on said gate assembly, means on a portion of said gate assembly for removably mounting said portion on said hanger, rods mounted on said removable gate portion, said rods extending at right angles to the direction of separative movement of said gate assembly, and a second removable portion of the gate assembly, forming a part of the first said removable portion, which is slidably mounted on said rods.

5. Motion picture apparatus comprising in combination, a support, two laterally extending sets of guides on said support, a film trap assembly slidably mounted on one of said sets of guides, a film gate assembly slidably mounted on the other set of guides, one of said assemblies being mounted on said support for separative movement from the other in a direction normal to the plane of the film strip, the sets of guides extending parallel to the plane of the film and supporting each of said assemblies so that either of said assemblies may be independently removed from the support in a plane parallel to the plane of the film strip and along a line normal to the edge of the film strip.

HERBERT GRIFFIN.
ALBERT KINDELMANN.